(12) United States Patent  
Ortiz-Gavin

(10) Patent No.: US 9,298,064 B2
(45) Date of Patent: Mar. 29, 2016

(54) MULTI-CAM HUB APPARATUS AND SYSTEMS

(71) Applicant: Sergio Alejandro Ortiz-Gavin, Los Angeles, CA (US)

(72) Inventor: Sergio Alejandro Ortiz-Gavin, Los Angeles, CA (US)

( * ) Notice: Subject to any disclaimer, the term of this patent is extended or adjusted under 35 U.S.C. 154(b) by 0 days.

(21) Appl. No.: 14/539,971

(22) Filed: Nov. 12, 2014

(65) Prior Publication Data

US 2015/0168812 A1    Jun. 18, 2015

Related U.S. Application Data

(60) Provisional application No. 61/903,315, filed on Nov. 12, 2013.

(51) Int. Cl.
    *G03B 15/02*       (2006.01)
    *G03B 15/06*       (2006.01)
    *F21V 7/18*        (2006.01)

(52) U.S. Cl.
    CPC .. *G03B 15/06* (2013.01); *F21V 7/18* (2013.01)

(58) Field of Classification Search
    CPC .................................. G03B 15/06; F21V 7/18
    See application file for complete search history.

(56) References Cited

U.S. PATENT DOCUMENTS

| | | | |
|---|---|---|---|
| 653,164 A | | 7/1900 | Bedel |
| 3,811,455 A | | 5/1974 | Thur |
| 4,594,645 A | * | 6/1986 | Terashita ........................ 362/18 |
| 5,841,146 A | * | 11/1998 | Briese ........................ 250/493.1 |
| 6,007,268 A | * | 12/1999 | Whittington et al. ......... 403/328 |
| 7,534,067 B2 | | 5/2009 | Chiodo |
| 8,157,397 B2 | | 4/2012 | Briese |

FOREIGN PATENT DOCUMENTS

FR           1293790       5/1962

OTHER PUBLICATIONS

International Search Report and Written Opinion of the International Searching Authority in International Application No. PCT/US2014/65314, dated Feb. 17, 2015.

\* cited by examiner

*Primary Examiner* — Donald Raleigh
(74) *Attorney, Agent, or Firm* — Edward C. Schewe

(57) ABSTRACT

A multiple cam hub apparatus for use with an umbrella that allows for deploying and collapsing a light reflecting umbrella rapidly to facilitate its use for stage, studio, motion picture and still photography. A multiple cam floating hail bearing locking hub and interlocking spacer tube are provided for opening and collapsing an umbrella using the internal compression or resilient forces in the umbrella construction. Utilizing a push and clockwise rotation of the locking hub, the umbrella is locked in the opened position. When it is time to breakdown or close the umbrella, a counterclockwise rotation of the locking hub unlocks the hub and the umbrella collapses.

20 Claims, 12 Drawing Sheets

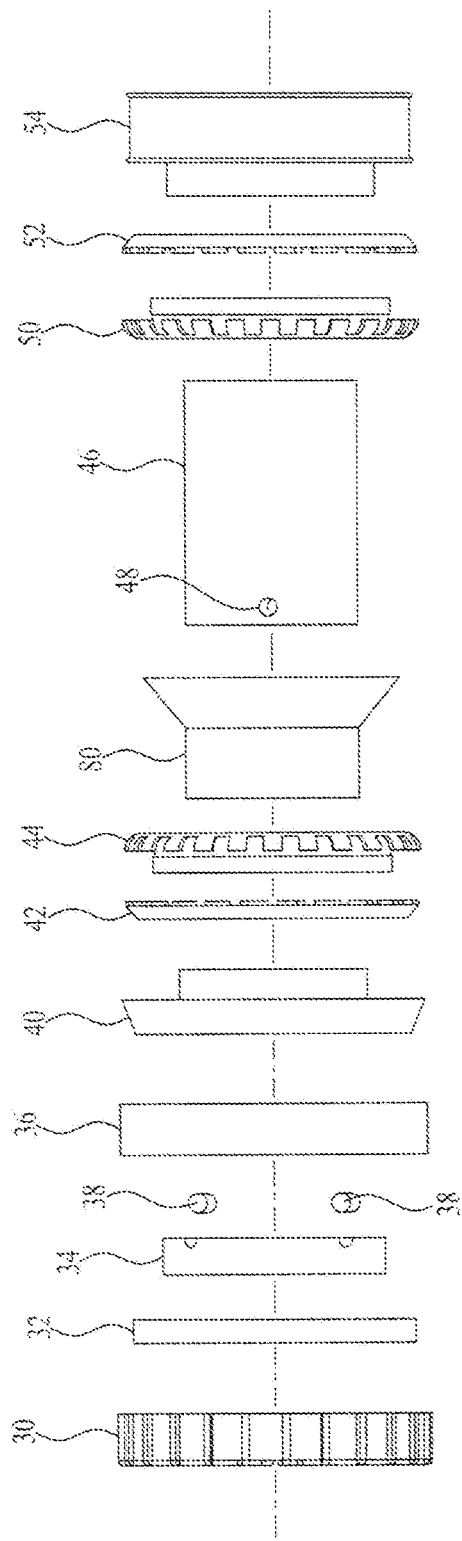

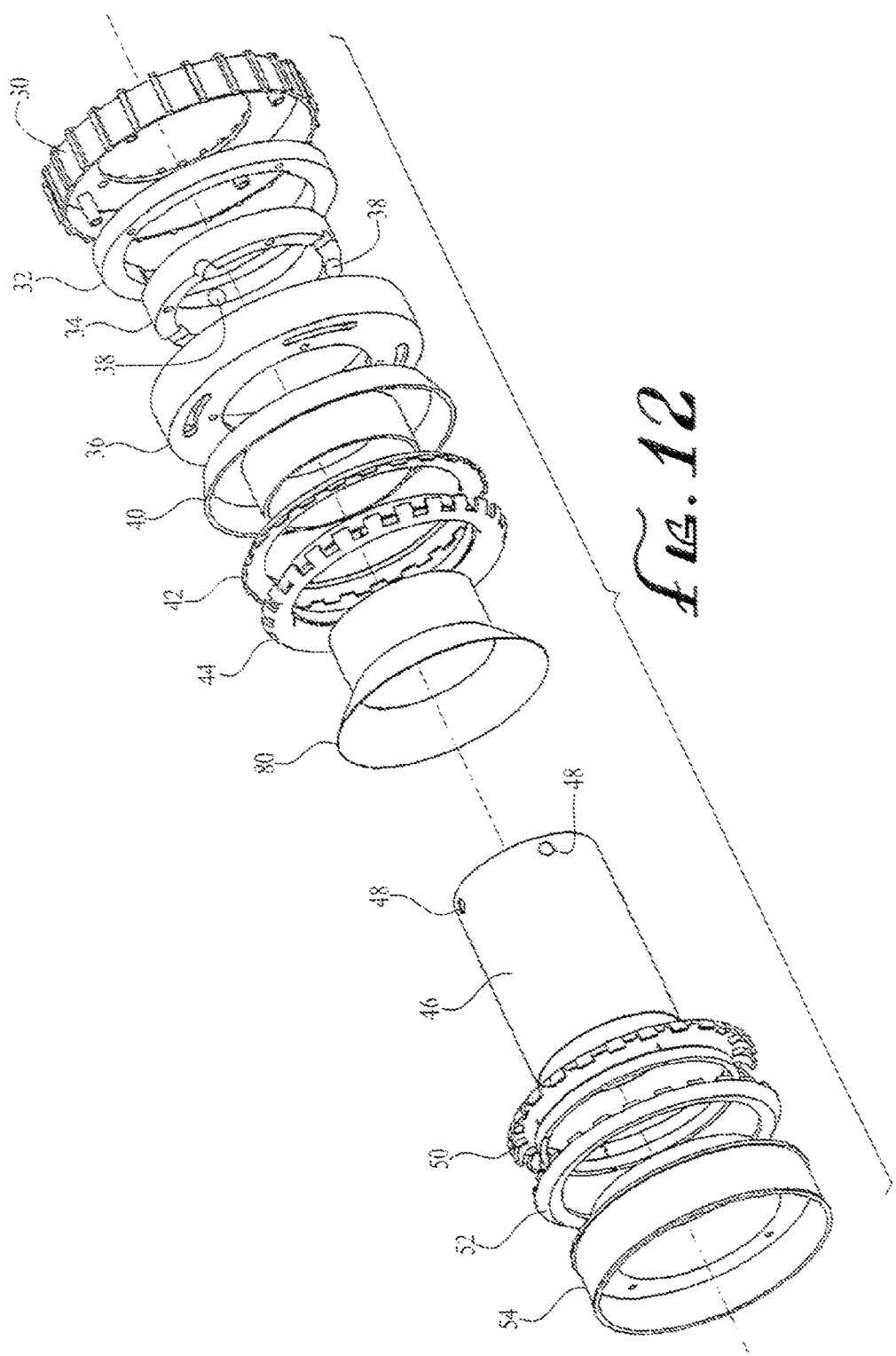

MULTI-CAM HUB APPARATUS AND SYSTEMS

RELATED APPLICATION DATA

This application claims the benefit of U.S. Provisional Patent Application Ser. No. 61/903,315 titled Multi-Cam Hub Apparatus and Systems filed on Nov. 12, 2013.

BACKGROUND OF THE INVENTION

1. Field of the Invention

The present invention is directed to multi-cam apparatus and systems for opening. securing and collapsing reflective umbrella apparatus and systems used for lighting in stage, studio, motion picture and still photography.

2. Description of Related Art

Conventional reflective umbrellas such as parabolic shaped umbrellas used in photography and film applications have inherent problems. These problems make the rapid deployment, opening and closing during set-up and break-down a complicated procedure that is difficult at best and sometimes dangerous. Pinching injuries to hands and fingers resulting in blood blisters and skinned knuckles are not uncommon.

Closing or breaking down of a conventional umbrella commonly requires floor space. The light source is removed and the umbrella is taken off the stand to break it down or close it. Typically the umbrella must be on the ground and the operator must put his or her hands, thumbs or fingers in between the spokes of the umbrella.

The operator pushes down hard enough on the ring of joints with thumbs and fingers until he or she overcomes the internal or resilient forces created that hold the umbrella in the open position and then "pop" the umbrella closed. This breakdown or collapsing procedure with the operator's fingers inserted in between the umbrella spokes and umbrella hubs has always been a dreaded step at the end of the day.

Sometimes additional set-up and breakdown tools are used that offer some but minimal assistance. Such tools are cumbersome to use, time consuming, obviously require additional parts and accessories and consequently often get lost or go missing during production.

One conventional umbrella is described in U.S. Pat. No. 5,841,146. A displaceable ring of toggle joints carrying the inner spokes of that umbrella are compressed to a point where the displaceable ring of toggle joints goes past the plane of the articulated joints. That action of going past the plane of articulated joints results in a reversal of direction of the resilient forces created by the tension between the umbrella spokes and umbrella skin.

Once that ring of toggle joints is displaced past the plane of articulated joints, the maximum point of resistance from the resilient forces created by that umbrella's spokes and umbrella skin is overcome. The resilient forces in that arrangement then change direction from front to back, and thus the displaceable ring of toggle joints is forced backward until for example, the supporting structure comes in contact with a rear hub.

There is a need for apparatus and systems that improve the speed and safety in opening, securing and collapsing umbrellas used in many applications including lighting in stage, studio, motion picture and still photography.

SUMMARY OF THE INVENTION

The inventive concepts described herein address and solve the opening, securing and collapsing problems with conventional umbrellas. Now comes the inventor's auto-collapsing umbrella to resolve the issues, correct the inherent problems with conventional apparatus and systems and streamline the set-up and break-down into a quick, safe, easy operation keeping one's fingers out of harm's way.

In one embodiment, a multiple cam ("multi-cam") floating ball bearing locking hub and interlocking spacer tube are provided for opening and collapsing an umbrella. Utilizing a clockwise rotation of the locking hub, the umbrella can be locked in the opened position. When it is time to breakdown or close the umbrella, a simple counterclockwise rotation of the locking huh is performed and the umbrella collapses.

There is no need to remove the umbrella off the mount and no need to remove it from the supporting stand. There is no need to remove the light source or a focus tube and there is no need to use set-up and break-down tools.

In an example, an umbrella has a front moveable hub and a rear hub. Attached to the rear hub is a spacer tube. The length and diameter of the spacer tube is determined by the umbrella size and the geometry of the spokes. As an example, in an embodiment with a 180 size umbrella a spacer tube approximately 220 millimeters long can be utilized.

On the front end of the spacer tube there are four indexing holes, although other embodiments of the invention could use a different number of indexing holes. The indexing holes correspond with the ball bearings in the bearing housing in the front moveable hub.

To open the umbrella into a locked position, the user pushes the top ring of the front hub toward the spacer tube and the rear hub. The spacer tube makes contact with the front hub bearing housing. The user then rotates the top ring clockwise and the multi-lobed circular cam ring engages the ball bearings and forces the ball bearings to index and interlock with the indexing holes on the spacer tube. The indexing holes on the spacer tube are smaller than the diameter of the ball bearings so that the ball bearings make hard contact with the indexing holes and are held in the indexed position by the pressure from the multi-lobed cam ring.

The bearing housing adjacent the top ring within the front hub holds the ball bearings in a loose floating position. The bearing windows in the bearing housing are smaller than the diameter of the ball bearings and thus hold the ball bearings captive. The bearing housing is stationary and does not move. As can be appreciated, the top ring is attached to the multi-lobed cam ring so that when a user pushes on the top ring and then rotates the top ring, the multi-lobed cam ring rotates with the top ring.

The ball bearings in the front hub and the indexing holes on the spacer tube are in alignment and should need no adjustment. This engagement makes for a safe and positive locking or arrestment between the front hub and the spacer tube. The ball bearings can be common ball bearings that are well known to persons skilled in the art.

To close the umbrella, a user rotates the top ring of the front hub approximately a ¼ turn counterclockwise, thereby rotating the multi-lobed cam ring. Rotating the top ring advances the earn lobes of the multi-lobe cam ring relative to the ball bearings and thereby forces the bail bearings out from the respective indexing holes and thereby disengages the front hub from the spacer tube.

The resilient forces created by the umbrella including the umbrella skin and the forces from the spokes cause the front hub to be pushed forward, away from the spacer tube and thus collapses the umbrella. The spacer tube contact with the front hub limits the spacing between the front hub and the rear hub to a distance so that the front hub is in front of the plane of the articulated joints of the umbrella.

In another example, to open the umbrella and keep the umbrella in a fully locked position the locking hub never goes past the plane of articulated joints in the umbrella and thus, never goes past the zero point where the resilient forces would change direction.

A spacer is attached to a rear mounting hub of the umbrella. The spacer is adapted to extend in front of the plane of the umbrella articulated joints to prevent the locking hub from moving past the plain of the articulated joints. The locking hub has a multi-cam floating ball bearing locking device consisting of multiple cams with an associated follower which in this example the follower is the ball bearings that in operation engage and interlock with holes on the leading edge of the spacer.

In order to open the umbrella into an open locked position, the operator moves or displaces the locking hub toward the spacer to initially unfurl the closed umbrella. In one example embodiment, a flange on the inside of the locking hub makes contact with and engages the spacer, interlocking and indexing with the floating ball bearings.

The locking hub is pushed toward the spacer and rotated ¼ turn clockwise so that a ring shaped multiple cam engages four steel floating ball bearings in the locking hub housing. This engagement by the multiple cam moves the ball bearings past the outside diameter of the spacer to index with the holes on the spacer making a solid positive interlocking arrestment holding the umbrella in a safe and solid open position.

In order to close or collapse the now locked open umbrella, the multi-cam floating ball bearing locking hub is rotated a ¼ turn counterclockwise. This advances the cam surfaces of the multiple cam relative to the ball bearings and thereby forces the ball bearings out from the respective holes in the spacer to disengage the front hub from the spacer.

The locking hub is forced away from the spacer and collapses the umbrella because the locking hub is in front of the plane of the articulated joints in the umbrella. Thus, the resilient forces in the umbrella, and thus also the umbrella ribs and the spokes impart forces to the locking hub to force the locking hub away from the spacer.

Instead of using the umbrella's resilient forces to hold the umbrella in an open locked position like in conventional umbrellas, the embodiments of the invention described herein use the compression or resilient forces in the umbrella to collapse the umbrella. The umbrella can be quickly collapsed while the umbrella is still on the stand with the light source in place if necessary thus allowing the umbrella to be quickly re-opened by an operator should the need arise.

The use of the inventive apparatus and systems described herein is quick, simple and fast. It requires minimal set-up and breakdown tools but most important of all the operator's hands, fingers and thumbs stay well away from any moving parts that might cause harm and painful injuries. Further advantages and embodiments of the invention will be apparent to persons skilled in the art from the drawings and description set forth herein.

BRIEF DESCRIPTION OF THE DRAWINGS

FIG. 11 is an exploded view of another embodiment of the invention.

FIG. 12 is an exploded view of an embodiment of the invention.

DETAILED DESCRIPTION OF EMBODIMENTS OF THE INVENTION

Reference is made to the Figures in which elements of the illustrated embodiments of the invention are given numerical designations so as to enable one skilled in the art to make and use the invention. It is understood that the following description is exemplary of embodiments of the invention and it is apparent to skilled persons that modifications are possible without departing from the inventive concepts herein described.

Figure 1:
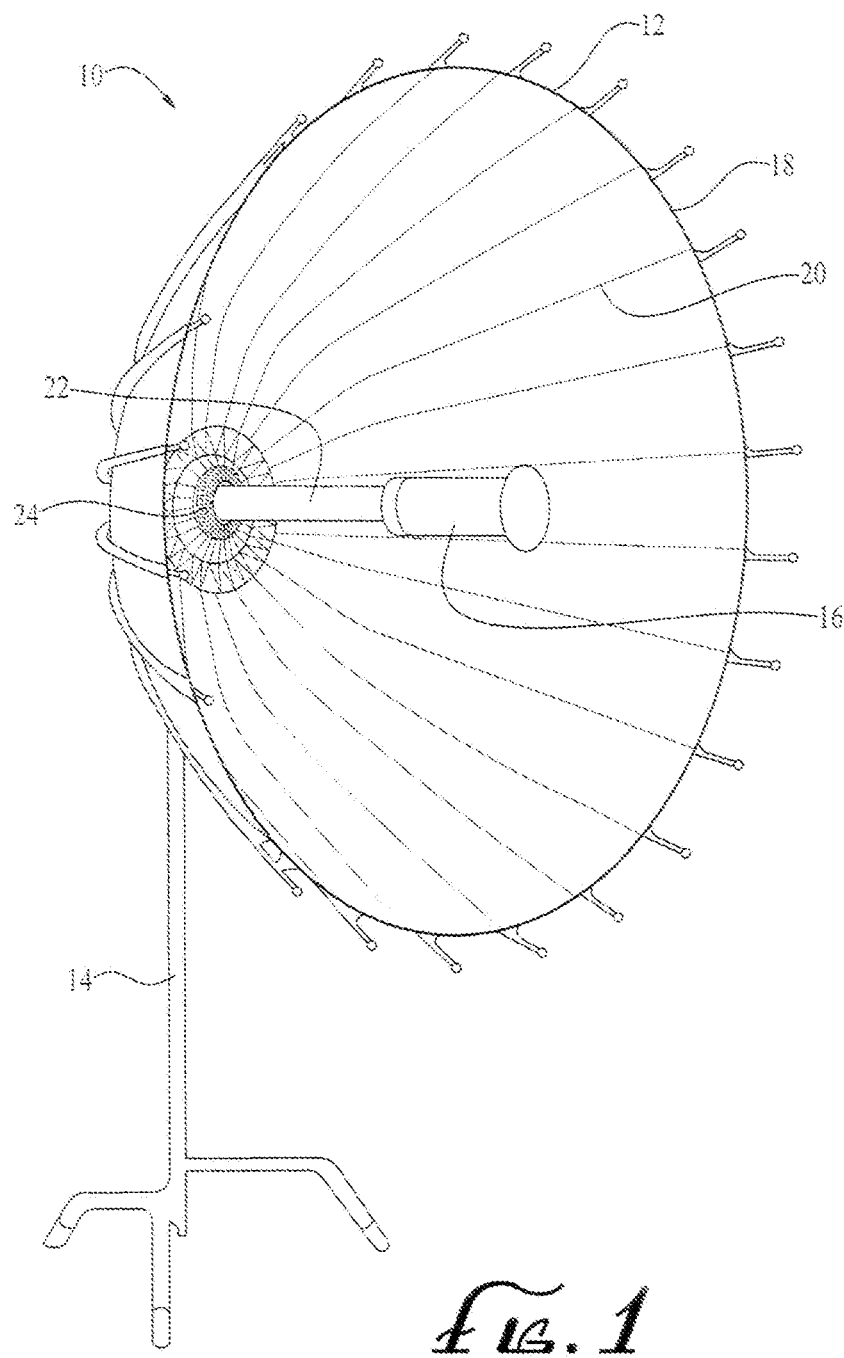
FIG. 1 illustrates one embodiment of the invention implemented in a reflector umbrella apparatus.

Referring to FIG. 1, an embodiment of the invention is incorporated into what is known in the art as a light reflector 10 that includes a reflecting umbrella 12 adjustably secured to a stand 14 and positioned adjacent to a light source 16 for providing lighting for stage, studio, motion picture and still photography. The umbrella 12 is made up of a reflective surface skin 18 attached in a conventional manner to spaced apart ribs 20.

Figure 2:
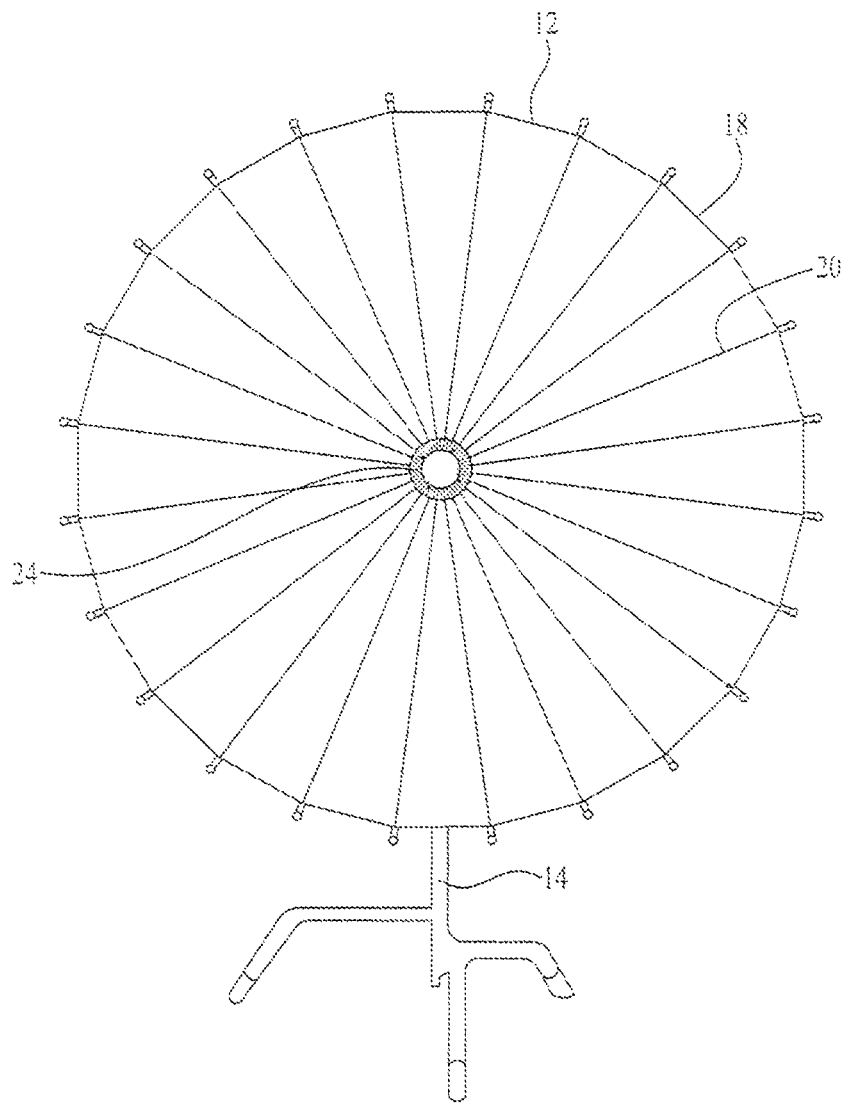
FIG. 2 is a front view that illustrates an embodiment of the invention implemented in an umbrella.

In the opened position shown in FIG. 1, and in FIG. 2 without an adjacent light source 16 or focusing tube 22, the skin 18 and ribs 20 are in compression when arranged into a substantially parabolic shape as shown in the Figures. These compression or resilient forces are exerted on the central hub area 24 that can be used advantageously in embodiments of the invention described herein.

Figure 3:
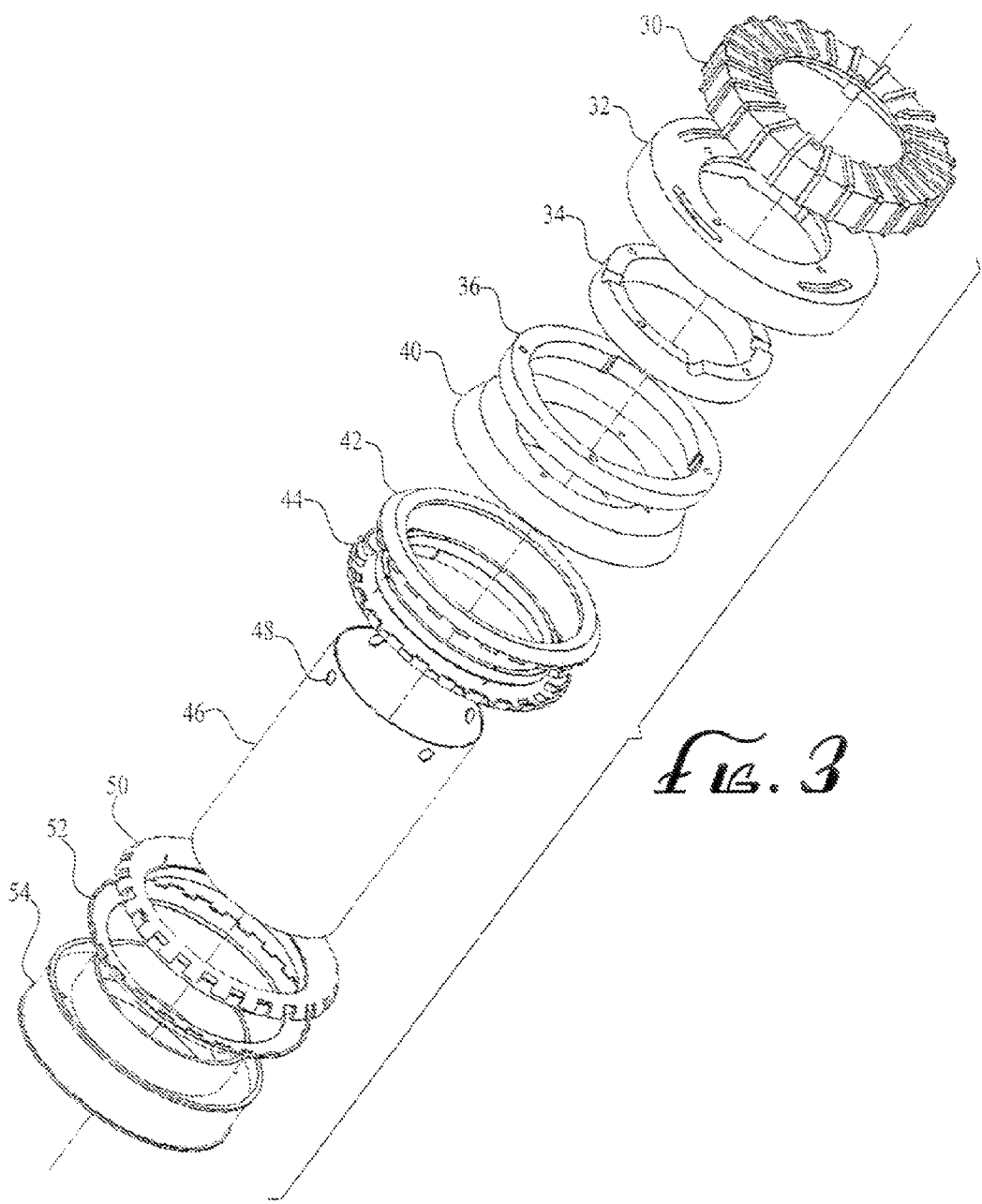
FIG. 3 illustrates an exploded diagram of an embodiment of the invention.
Figure 8:
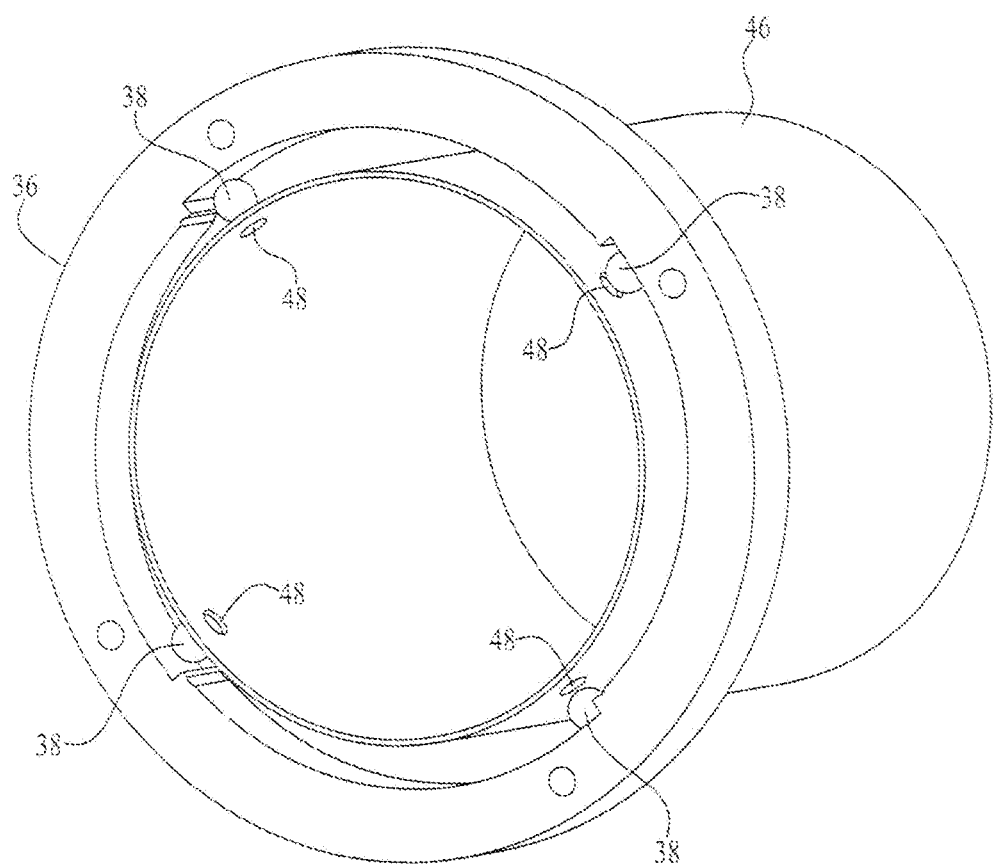
FIG. 8 is a perspective side view of an embodiment showing the ball bearings.

FIG. 3 illustrates an embodiment of the invention in an exploded view illustrating the top ring 30 placed adjacent to the cam ring 32. The bearing housing top ring 34 is secured to the bearing housing base ring 36 with the ball bearings 38, as shown in FIG. 8, held within the bearing housing top ring 34 and bearing housing base ring 36.

The locking hub base ring 40 is secured adjacent to the spoke cage base ring 42 which is secured to the spoke cage top ring 44 as shown in FIG. 3. The spacer tube 46 includes the spacer tube indexing holes 48. The spacer tube 46 is attached as shown in FIGS. 4-7 adjacent to the second spoke cage top ring 50 which is secured to the second spoke cage base ring 52. The second spoke cage base ring 52 is secured adjacent to the rear mounting hub 54 as illustrated in FIGS. 4-7.

Figure 4:
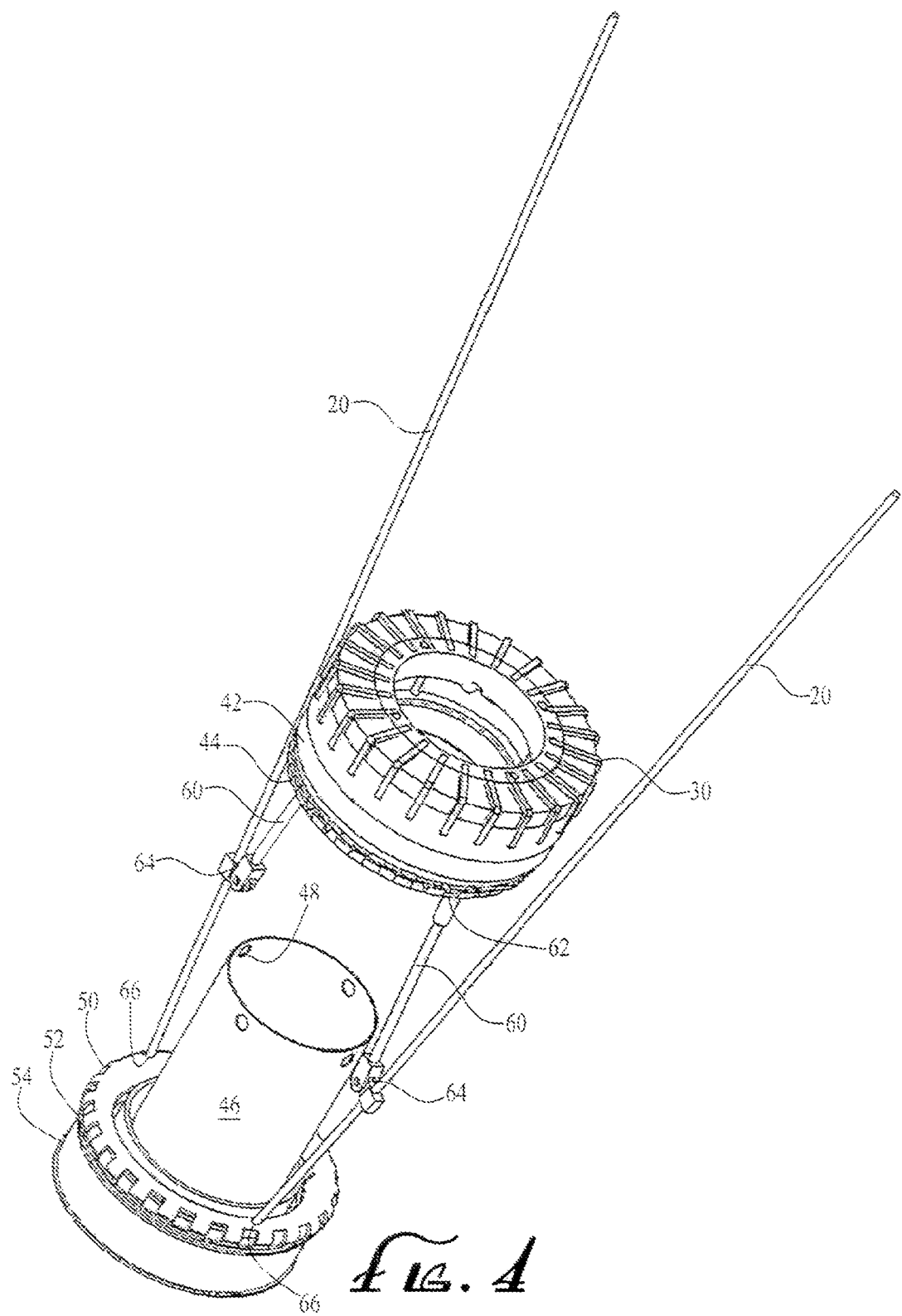
FIG. 4 is a simplified perspective view of one embodiment.
Figure 5:
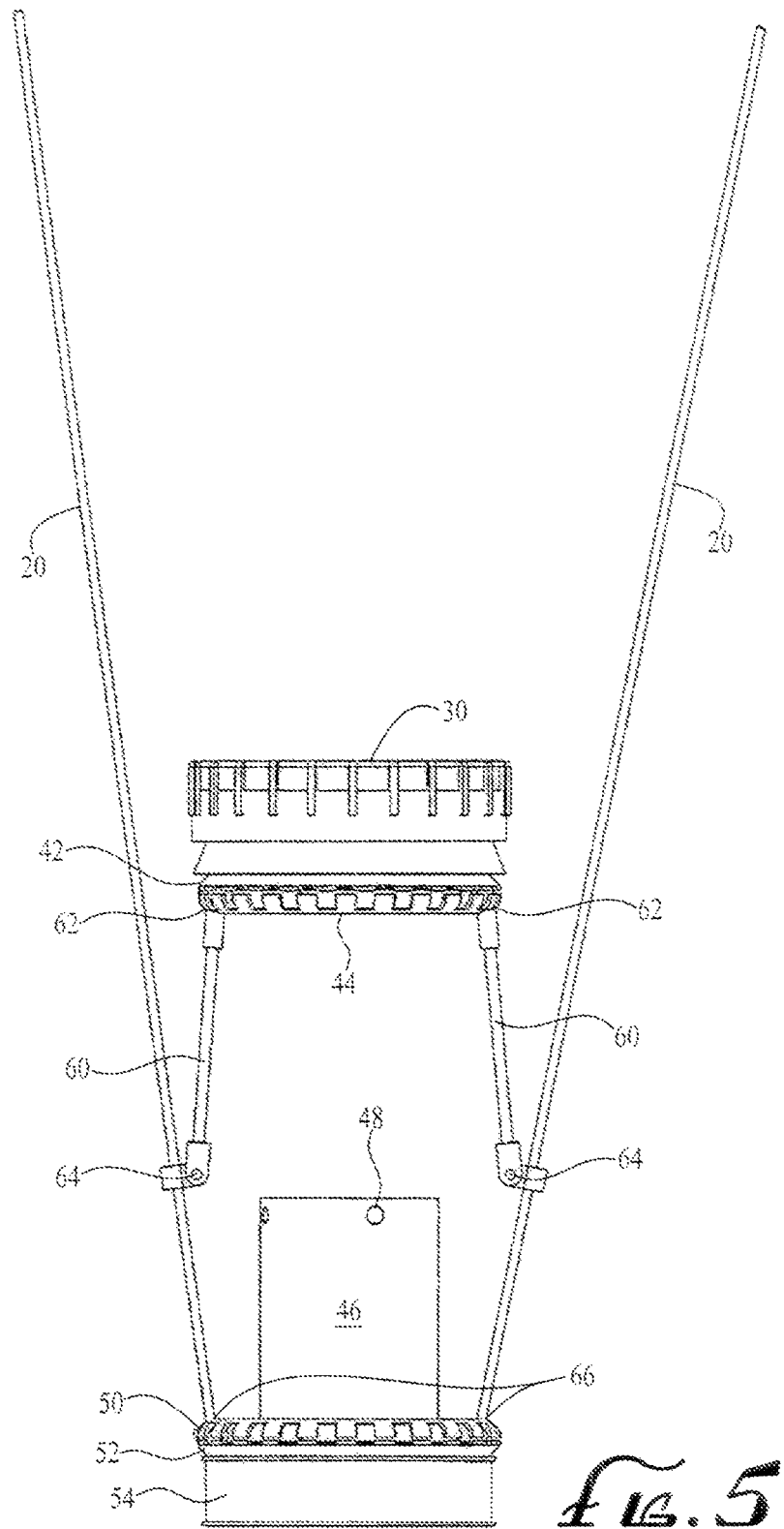
FIG. 5 is a simplified side view diagram of one embodiment.

FIG. 4 and FIG. 5 are simplified figures showing two ribs 20 to illustrate the arrangement of one embodiment with the top ring 30 assembled together with the cam ring 32, the bearing housing top ring 34 and the bearing housing base ring 36, with the ball bearings 38 held within, the locking hub base ring 40, the spoke cage base ring 42 and the spoke cage top ring 44 as shown. FIGS. 4 and 5 also show the arrangement of the spacer tube 46 and the rear mounting hub 54.

As illustrated in the Figures, a spoke 60 is secured at one end to a toggle joint 62 secured by the spoke cage base ring 42 and the spoke cage top ring 44. The spoke 60 is connected at its other end to a corresponding rib 20 by an expanding joint 64 on the corresponding rib 20 as shown in FIG. 4 and in FIG. 5.

The rib 20 is connected to a rear mounting hub joint 66 between the second spoke cage top ring 50 and the second spoke cage base ring 52. In the illustrated embodiment, this spoke and rib configuration illustrated in FIG. 4 and in FIG. 5 is the arrangement for all ribs 20 for the umbrella 12.

Figure 6:
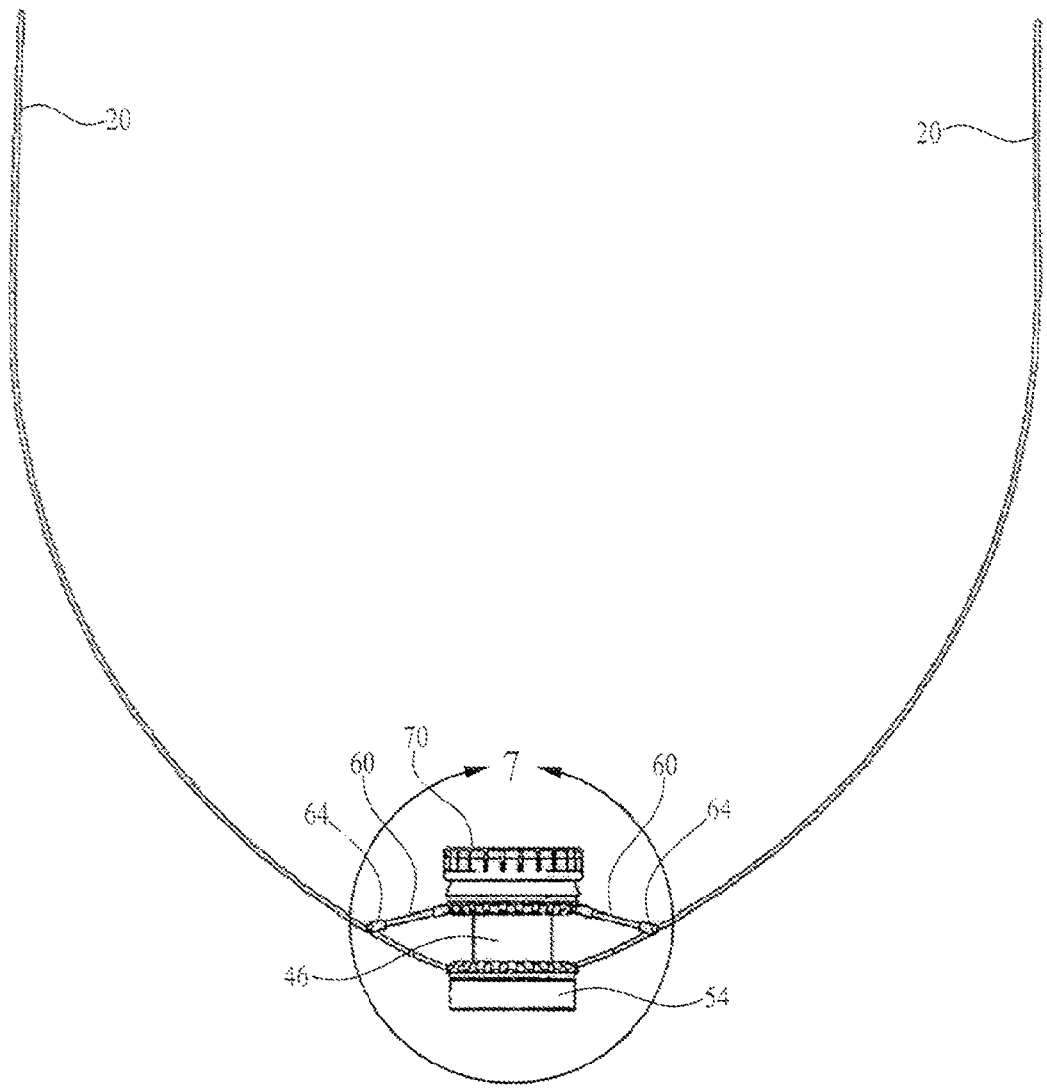
FIG. 6 illustrates a simplified side view diagram of one embodiment.

FIG. 6 illustrates an embodiment where the locking hub 70, that has the top ring 30, the cam ring 32, the bearing housing top ring 34, the bearing housing base ring 36 with the ball bearings 38 held within the top ring 34 and base ring 36, the locking hub base ring 40, the spoke cage base ring 42 and the spoke cage top ring 44 is moved into contact with the spacer tube 46.

This displacement of the locking hub 70 to contact with the spacer tube 70 causes the ribs 20 to move outward by way of the toggle joints 62 and the spokes 60 to the corresponding ribs 20 through the corresponding expanding joints 64. Thus, displacement of the locking hub 70 to contact with the spacer tube 46 unfurls the umbrella 12 into an opened position.

The displacement of the locking hub 70 toward the spacer tube 46 creates compression forces or resilient forces through the toggle joints 62, the spokes 60, the expanding joints 64, the ribs 20 and into the umbrella 12.

Figure 7:
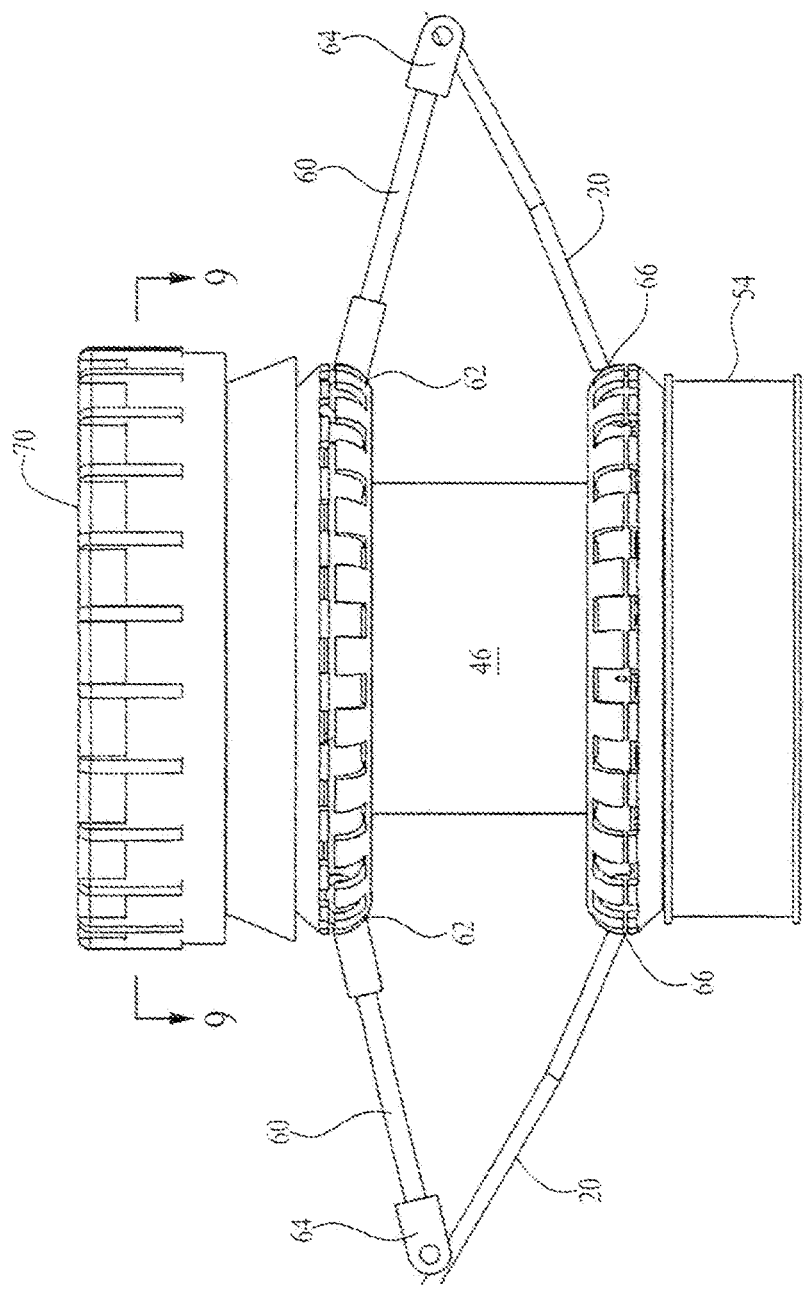
FIG. 7 illustrates a side view of one embodiment of the invention.

In this embodiment, the locking hub 70 is positioned in front of the plane of the expanding joints 64 so that the built-up compression or resilient forces urge the locking hub 70 forward meaning away from the spacer tube 46 and so as to close or collapse the umbrella 12. This embodiment is illustrated in FIG. 7 showing the locking hub 70 in contact with the spacer tube 46.

The locking hub 70 is positioned in front of the expanding joints 64 so that the compression or resilient forces in the umbrella 12, the ribs 20, the expanding joints 64, the spokes 60 and the toggle joints 62 force the locking hub 70 away from the spacer tube 46 so as to assist in closing or collapsing the umbrella 12.

Embodiments of the invention include different sizes of umbrellas where the locking hub 70 remains in front of the plane of the expanding joints 64 of the umbrella 12 by use of a spacer such as a spacer tub 46 and the compression or resilient forces urge or force the locking hub 70 away from the spacer tube 46 so as to assist in closing or collapsing the umbrella 12.

FIG. 8 shows one embodiment illustrating in a partial view the ball bearings 38 and the bearing housing base ring 36. The locking hub 70 is positioned so that the ball bearings 38 are positioned opposite a respective spacer tube indexing hole 48.

Figure 9:
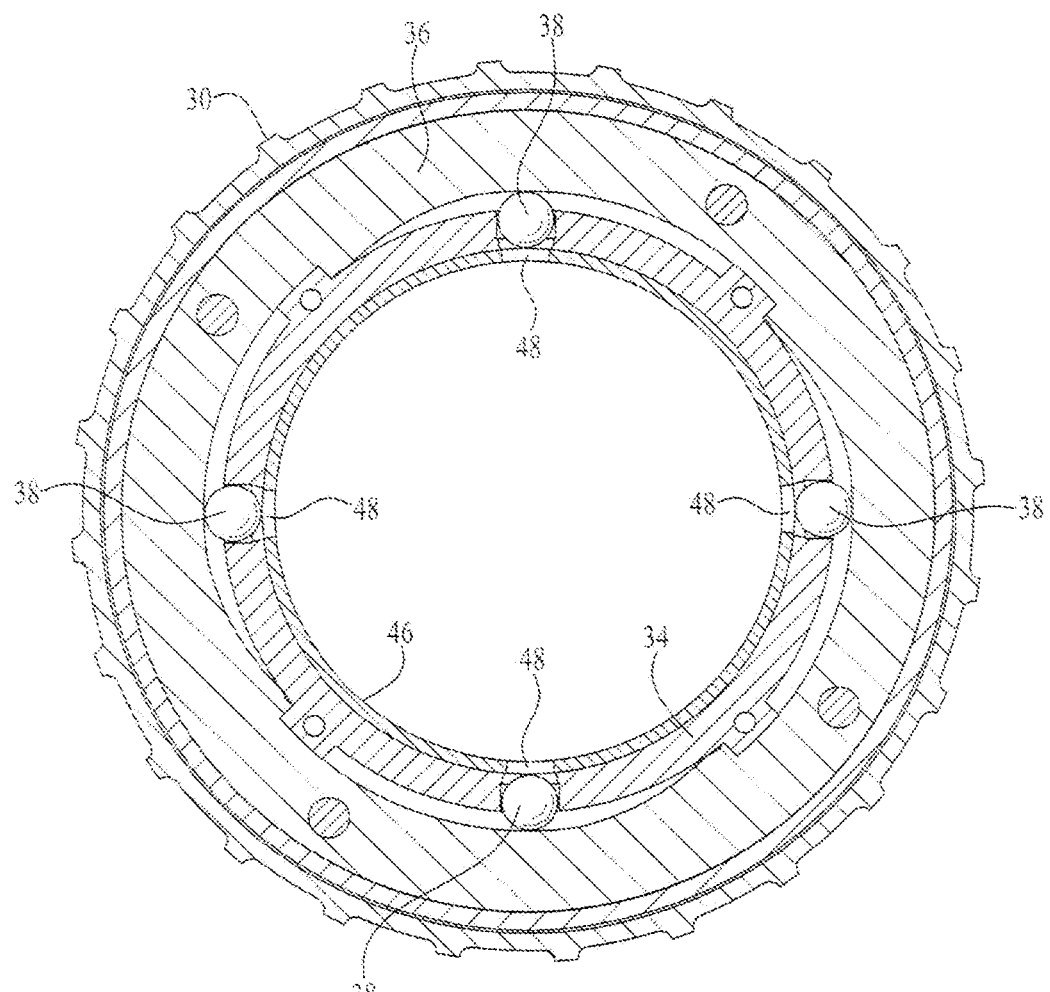
FIG. 9 illustrates a section view of an embodiment of the invention.
Figure 10:
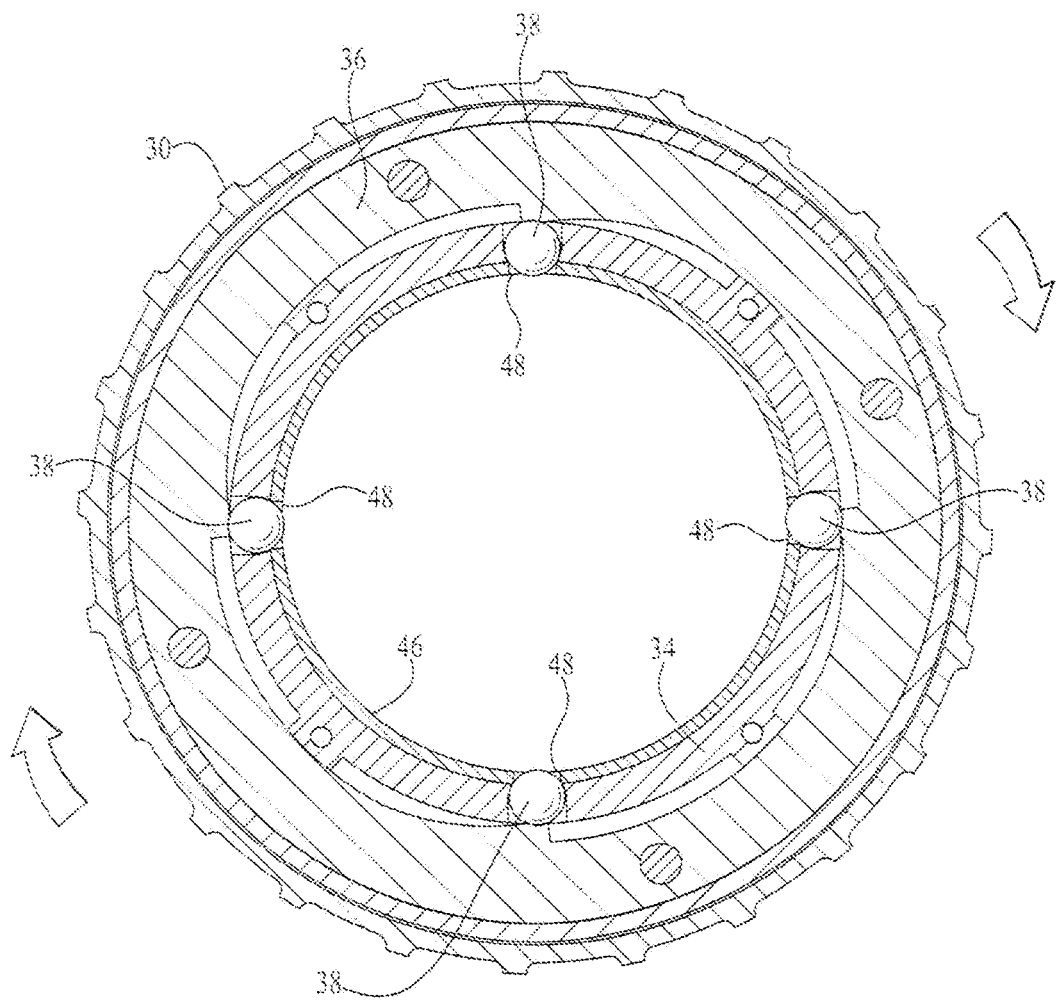
FIG. 10 is a section view of an embodiment with arrows to illustrate this embodiment.

FIG. 9 and FIG. 10 illustrate embodiments of the invention showing an exemplary operation of the locking hub 70 secured to the spacer tube 46 to hold the umbrella 12 in an opened position. The operator displaces the locking hub 70 toward the spacer tube 46 to initially unfurl the closed umbrella. As illustrated in FIG. 9, the locking hub 70 makes contact with and engages the spacer tube 46 which interlocks with and indexes with the floating ball bearings 38.

Referring to FIG. 10, while the user is pushing on the top ring 30 of the locking hub 70 toward the spacer tube 46 and toward the rear mounting hub 54, the locking hub 70 is rotated ¼ turn clockwise and a ring shaped multiple cam on the bearing housing base ring 36 engages four steel floating ball bearings 38. This engagement by the multiple cams imparts motion onto the ball bearings 39 to move the ball bearings 38 past the outside diameter of the spacer tube 46 and to index with the holes 48 on the spacer tube 46 making a solid positive interlocking arrestment holding the locking hub 70 and thereby securing the umbrella 12 in an opened position.

In order to close or collapse the now opened or locked open umbrella, the top ring 30 of the locking hub 70 is rotated a ¼ turn counter-clockwise. In this embodiment, rotating the top ring 30 advances the cam lobes of the bearing housing base ring 36 relative to the ball bearings 38 and thereby forces the ball bearings 38 out from the respective indexing holes 48 of the spacer tube 46.

The locking hub 70 is forced away from the spacer tube 46 and the umbrella 12 is collapsed. This is because in the locked position, the locking hub 70 remains in front of the plane of expanding joints 64 in the umbrella 12 so that the compression or resilient forces in the umbrella 12 are forcing and directing the locking hub 70 away from the spacer tube 46.

FIG. 11 shows a further embodiment that includes an alignment tube 80 as illustrated in the figures. The alignment tube 80 is adapted to assist the operator to contact the locking hub 70 to the spacer tube 46 so that the arrangement between the locking hub 70 and the spacer tube 46 is appropriate for a desired use of the umbrella 12. As an example, in an embodiment with a 180 size umbrella, an alignment tube approximately 140 millimeters long can be utilized. The alignment tube 80 can be constructed in various configurations including a cone configuration and other configurations are within the scope of the invention.

While the present invention has been described with regards to particular embodiments, it is recognized that additional variations of the present invention may be devised by persons skilled in the art without departing from the inventive concepts disclosed herein and the invention is entitled to the full breadth and scope of the claims.

What is claimed is:

1. A light reflecting apparatus comprising:
   an umbrella operably attached about a central mounting hub to hold a support for a photographic light source, the umbrella having expanding joints so that the umbrella is adapted to open into a light reflecting configuration about the light source;
   a spacer tube adjacent to the central mounting hub;
   a locking hub operably connected to the umbrella expanding joints through toggle joints and spokes connected to the locking hub, the locking, hub is always positioned in front of the plane of the expanding joints,
   so that displacement of the locking hub toward the spacer tube to contact the spacer tube opens the umbrella into the light reflecting configuration, the spacer tube dimensioned so that the locking hub is always positioned in front of the plane of the umbrella expanding joints upon contact with the spacer tube so that the resilient forces in the umbrella are transmitted to the locking hub through the operable connection of the umbrella expanding joints to the locking hub through the spokes and the toggle joints to force the locking hub away from the spacer tube to collapse the umbrella.

2. The apparatus of claim 1 wherein the locking hub is secured to the spacer tube by actuating a multi-lobe cam within the locking hub so that one or more ball bearings engage and index with index holes on the spacer tube.

3. The apparatus of claim 2 wherein the locking hub is disengaged from the spacer tube by actuating the multi-lobe cam within the locking hub so that the bail bearings disengage from the index holes on the spacer tube.

4. The apparatus of claim 1 comprising an alignment tube connected to the locking hub, the alignment tube adapted to facilitate engagement between the locking hub and the spacer tube.

5. The apparatus of claim 1 including a focusing tube for a photographic light source, the focusing tube support being movable through the central mounting hub and through both the spacer tube and the locking hub without contacting the spacer tube and without contacting the locking, hub so that the focusing tube is adapted to adjust the position of a photographic light source secured to the focusing tube within the light reflecting configuration of the umbrella.

6. A system for opening, securing and collapsing a light reflective apparatus comprising:
   a reflecting umbrella having a reflective surface skin attached to a plurality of spaced, apart ribs, each of the spaced apart ribs having an expanding joint thereon and each of the spaced apart ribs operably attached to a central mounting hub, the central mounting hub adapted to support a focusing tube, the focusing tube adapted to secure a light source so as to adjust the position of the light source so that the reflective surface skin of the reflecting umbrella is about the light source;
   a locking hub connected to the expanding joints on the Spaced apart ribs by toggle joints and spokes connected to the locking hub, the locking hub having a top ring and the locking hub enclosing a ring, shaped multiple cam and one or more ball bearings;
   a spacer tube attached to the central mounting hub extending award the locking hub, the spacer tube including one or more indexing holes, the indexing holes being smaller than the diameter of the one or more ball bearings; and
   the spacer tube arranged so that:
   (i) displacement, of the locking hub toward the spacer time to contact the spacer tube causes resilient forces through the toggle joints, the spokes, the expanding joints, the spaced apart ribs and into the umbrella and causes the spaced apart ribs to move away from the locking hub through the toggle joints and spokes to the spaced apart ribs through the expanding joints on the spaced apart ribs to unfurl the umbrella into an opened position,
   (ii) the locking hub always remains in front of the plane of the expanding joints and the resilient forces urge the locking hub away from the spacer tube,
   (iii) to secure the locking hub to the spacer tube with the umbrella in an opened position, the top ring of the locking hub is rotated to move the cam surfaces of the ring shaped multiple cam to engage the one or more ball bearings and move the one or more ball bearings past the outside diameter of the spacer tube to index with the one or more indexing holes of the spacer tube, thereby securing the locking hub to the spacer tube, and
   (iv) to collapse the opened umbrella, the top ring of the locking hub is rotated in the opposite direction to move the cam surfaces of the ring shaped multiple cam relative to the one or more ball bearings and thereby the one or more bail bearings move out from the one or more indexing holes of the spacer tube, thereby disengaging the locking hub from the spacer tube and the locking hub is urged away from the spacer tube and thereby collapses the umbrella.

7. The system of claim 6 further comprising an alignment tube connected to the locking hub, the alignment tube adapted to facilitate engagement between the locking hub and the spacer tube.

8. The system of claim 6 wherein the reflecting umbrella is a parabolic umbrella.

9. The system of claim 6 further comprising a focusing tube, the focusing tube being movable through the central mourning hub and movable through both the spacer tube and the locking hub without contacting the spacer tube and without contacting the locking hub.

10. A collapsible reflector system comprising:
    a reflecting umbrella having a reflective surface skin attached to a plurality of spaced apart ribs, each of the spaced apart ribs having an expanding joint thereon and each of the spaced apart ribs operably attached to a central mounting hub, the central mounting hub adapted to support a focusing, tube, the focusing tube adapted to secure a light source and adjust the position of the light source so that the reflective surface skin of the reflecting umbrella is about the light source;
    a locking hub operably connected to the expanding joints on the spaced apart ribs, the locking hub enclosing a multi-lobe earn and one or more ball bearings;
    a spacer tube attached to the central mounting hub extending toward the locking hub the spacer tube including one or more indexing holes, the indexing holes being smaller than the diameter of the one or more ball bearings; and
    the spacer tube arranged so that:
    (i) displacement of the locking hub toward the spacer tube to contact the spacer tube causes resilient forces into the spaced apart ribs and the umbrella and the spaced apart ribs move a ay from the locking hub to unfurl the umbrella into an opened position,
    (ii) the locking hub always remains in front of the plane of the expanding joints and the resilient forces cause the locking hub to move away irons the spacer tube,
    (iii) to secure the locking hub to the spacer tube with the umbrella in an opened position despite the resilient forces, a portion of the locking hub is engaged to move the cam surfaces of the multi-lobe cam to engage the one or more bail bearings and move the one or more ball bearings past the outside diameter of the spacer tube to index with the one or more indexing holes of the spacer tube, and
    (iv) to collapse the secured and opened umbrella, a portion of the locking hub is engaged to advance the cam surfaces of the multi-lobe cam relative to the one or more ball bearings and the one or more ball bearings are forced out from the one or more indexing holes of the spacer tube, thereby disengaging, the locking hub from the spacer tube and the locking nub is urged away from the spacer tube to collapse the umbrella.

11. The system of claim 10 further comprising an alignment tube connected to the locking hub, the alignment tube adapted to facilitate engagement between the locking hub and the spacer tube.

12. The system of claim 10 wherein the reflecting umbrella is a parabolic umbrella.

13. The system of claim 10 further comprising a focusing tube, the focusing tube being movable through the central mounting hub and movable through both the spacer tube and the locking hub without contacting the spacer tube and without contacting, the locking hub.

14. A method for opening, securing and collapsing a light reflector comprising:
    configuring a reflecting umbrella having a reflective surface skin attached to a plurality of spaced apart ribs, each of the spaced apart ribs having anexpanding joint thereon and each of the spaced apart ribs operably attached to a central mounting hub, the central mounting hub adapted to support a focusing tube, the focusing, tube adapted to secure a light source so as to adjust the position of the light source so that the reflective surface skin of the reflecting umbrella is about the light source;

configuring a locking hub connected to the expanding joints on the spaced apart ribs by toggle joints and spokes connected to the locking hub, the locking hub having a top ring and the locking hub enclosing a ring shaped multiple cam and one or more ball bearings;

configuring a spacer tube attached to the central mounting hub extending toward the locking hub, the spacer tube including one or more indexing holes, the indexing holes being smaller than the diameter of the one or more ball bearings, wherein the spacer tube is arranged so that:

(i) displacement of the locking hub toward the spacer tube to contact the spacer tube causes resilient threes through the toggle joints, the spokes, the expanding joints, the spaced apart ribs and into the umbrella and causes the spaced apart ribs to move away from the locking hub through the toggle joints and spokes to the spaced apart ribs through the expanding joints on the spaced apart ribs to unfurl the umbrella into an opened position, and (ii) the locking hub always remains in front of the plane of the expanding joints and the resilient forces urge the locking hub away from the spacer tube;

securing the locking hub to the spacer tube with the umbrella in an opened position whereby the top ring of the locking hub is rotated to move the cam surfaces of the ring shaped multiple cam to engage the one or more ball bearings and move the one or more ball bearings past the outside diameter of the spacer tube to index with the one or more indexing holes of the spacer tube, thereby securing the locking hub to the spacer tube; and then collapsing the opened umbrella, whereby the top ring of the locking hub is rotated in the opposite direction to move the cam surfaces of the ring shaped multiple cam relative to the one or more bail bearings to cause the one or more ball bearings to move out from the one or more indexing holes of the spacer tube, thereby disengaging the locking hub from the spacer tube so that the locking hub is urged away from the spacer tube to collapse the umbrella.

15. The method of claim 14 whereby for the collapsing the opened umbrella step, the umbrella is collapsed d while the umbrella is on a stand.

16. The method of claim 15 whereby for the umbrella is collapsed having a focusing tube supported on the central mounting hub, the focusing tube being movable through both the spacer tube and the locking hub without contacting the spacer tube and without contacting the locking hub.

17. A method for opening, securing and collapsing a reflector comprising the steps of:

configuring a reflecting umbrella having a reflective surface skin attached to a plurality of spaced apart ribs, each of the spaced apart ribs having an expanding joint thereon and each of the spaced apart ribs operably attached to a central mounting hub, the central mounting hub adapted to support a focusing tube, the focusing tube adapted to secure a light source and adjust the position of the light source so that the reflective surface skin of the reflecting umbrella is about the light source;

configuring a locking hub operably connected to the expanding joints on the spaced apart ribs, the locking hub enclosing a multi-lobe cam and one or more ball bearings;

configuring a spacer tube attached to the central mounting hub extending toward the locking hub, the spacer tube including one or more indexing holes, the indexing holes being smaller than the diameter of the one or more ball bearings, wherein the spacer tube is arranged so that:

(i) displacement of the locking hub toward the spacer tube to contact the spacer tube causes resilient forces into the spaced apart ribs and the umbrella and the spaced apart ribs move away from the locking hub to unfurl the umbrella into an opened position, and (ii) the locking hub always remains in front of the plane of the expanding joints and the resilient forces cause the locking hub to move away from the spacer tube;

securing the locking hub to the spacer tube with the umbrella in an opened position despite the resilient forces, whereby a portion of the locking hub is engaged to move the cam surfaces of the multi-lobe cam to engage the one or more ball bearings and move the one or more ball bearings past the outside diameter of the spacer tube to index with the one or more indexing holes of the spacer tube; and then engaging a portion of the locking hub to advance the cam surfaces of the multi -lobe cam relative to the one or more ball bearings so that the one or more ball bearings are forced out from the one or more indexing holes of the spacer tube, thereby disengaging she locking hub from the spacer tube and the locking hub is urged away from the spacer tube to collapse the umbrella.

18. The method of claim 17 whereby for the collapsing the opened umbrella step, the reflecting umbrella is collapsed while the reflecting umbrella is on a stand.

19. The method of claim 18 whereby the reflecting umbrella is collapsed having a focusing tube supported. on the central mounting hub, the focusing tube being movable through both the spacer tube and the locking hub without contacting the spacer tube and without contacting the locking hub.

20. The method of claim 18 further comprising the step of re-opening the collapsed reflecting umbrella.

* * * * *